United States Patent [19]
Campbell

[11] 3,867,356

[45] Feb. 18, 1975

[54] ARYLENE SULFIDE POLYMERS

[75] Inventor: Robert W. Campbell, Bartlesville, Okla.

[73] Assignee: Phillips Petroleum Company, Bartlesville, Okla.

[22] Filed: Nov. 19, 1973

[21] Appl. No.: 416,774

[52] U.S. Cl................ 260/79.1, 260/79, 260/534 R
[51] Int. Cl............................................ C08g 23/00
[58] Field of Search............................ 260/79, 79.1

[56] References Cited
UNITED STATES PATENTS

| | | | |
|---|---|---|---|
| 3,354,129 | 11/1967 | Edmonds, Jr. et al. | 260/79.1 |
| 3,538,166 | 11/1970 | Campbell et al. | 260/609 E |

*Primary Examiner*—Melvyn I. Marquis

[57] ABSTRACT

A method of producing arylene sulfide polymers employing (1) polyhalosubstituted aromatic compounds; (2) alkali metal bisulfides; (3) alkali metal aminoalkanoates; and, (4) organic amides.

19 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one alkali metal aminoalkanoate, at least one alkali metal bisulfide and at least one organic amide are contacted. Use of the alkali metal aminoalkanoate results in arylene sulfide polymers in higher yields and with higher molecular weights, as evidenced by higher inherent viscosities and higher crystalline melting points of the polymers, than are obtained when an alkali metal aminoalkanoate is not employed.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Alkali metal aminoalkanoates which can be employed in the process of this invention can be represented by the formula $R_2N(CR_2)_nCO_2M$, wherein each R is selected from the group consisting of hydrogen and hydrocarbyl radicals selected from alkyl, cycloalkyl, and aryl, and combinations thereof such as alkaryl, aralkyl, and the like, the number of carbon atoms in each of said hydrocarbyl radicals being within the range of 1 to about 12, M is an alkali metal selected from lithium, sodium, potassium, rubidium, and cesium, $n$ is an integer having a value of 1 to about 12, and the total number of carbon atoms in each molecule of the alkali metal aminoalkanoate is within the range of 2 to about 24.

Examples of some alkali metal aminoalkanoates which can be employed in the process of this invention include lithium aminoacetate, sodium N,N-dimethyl-2-aminopropionate, potassium N-ethyl-3-cyclopentyl-3-aminopropionate, sodium N-methyl-4-aminobutyrate, sodium N-methyl-6-aminohexanoate, rubidium N-isopropyl-3-phenyl-5-aminopentanoate, cesium N-butyl-N-cyclohexyl-3-isopropyl-6-aminohexanoate, potassium N-phenyl-3-butyl-7-aminooctanoate, sodium N-cyclopentyl-4-hexyl-10-aminodecanoate, lithium N-hexyl-6-pentyl-13-aminotridecanoate, sodium N-decyl-4-aminododecanoate, potassium N-nonyl-2-aminotetradecanoate, sodium N-o-tolyl-3-amino-4-phenylbutyrate, rubidium N,N-dibenzyl-2-p-tolyl-3-aminopropionate, cesium 4-aminobutyrate, sodium 5-aminopentanoate, potassium 6-aminohexanoate, and the like, and mixtures thereof.

Alkali metal bisulfides which can be used in the process of this invention include lithium bisulfide, sodium bisulfide, potassium bisulfide, rubidium bisulfide, cesium bisulfide, and mixtures thereof.

The organic amides used in the method of this invention should be substantially liquid at the reaction temperatures and pressures employed. The amides can be cyclic or acyclic and can have 1 to about 24 carbon atoms per molecule, preferably 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N-dodecyl-3-octyl-2-pyrrolidone, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the alkali metal bisulfide, the alkali metal aminoalkanoate and the organic amide or which can be present in a composite formed from the alkali metal bisulfide, the alkali metal aminoalkanoate and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the alkali metal bisulfide, the alkali metal aminoalkanoate and the organic amide is maintained at polymerization conditions to produce the arylene sulfide polymer.

The ratio of reactants can vary considerably but about 0.9 to about 2, and preferably about 0.95 to about 1.2, gram-moles of the polyhalo-substituted aromatic compound will generally be employed per gram-mole of alkali metal bisulfide.

The alkali metal aminoalkanoate generally will be employed in an amount within the range of from about 0.3 to about 4, and preferably from about 0.4 to about 2, gram-moles per gram-mole of alkali metal bisulfide.

The amount of organic amide employed can also vary over a wide range but will generally be within the range of from about 100 grams to about 2,500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

It is within the scope of the invention to bring the polyhalo-substituted aromatic compound, the alkali metal bisulfide, the alkali metal aminoalkanoate, and the organic amide into contact in any order.

Also, it is within the scope of this invention to remove water from any combination of the aforesaid compounds.

The following examples provide the basis for the foregoing statements.

EXAMPLES

In the following examples, values shown for crystalline melting point were determined by differential thermal analysis. Values for the inherent viscosity were determined at 206° C. in 1-chloronaphthalene at a polymer concentration of 0.4 g/100 ml solution.

EXAMPLE I

The following example illustrates the method of this invention employing sodium N-methyl-4-aminobutyrate and sodium bisulfide.

To a stirred autoclave were charged 41.8 g of sodium bisulfide (0.50 gram-mole, 67 percent assay), 69.5 g of sodium N-methyl-4-aminobutyrate (0.50 gram-mole) and 80 g of N-methyl-2-pyrrolidone. The mixture was heated under a slow flow of $N_2$ to 198° C. in 75 minutes. Distillate was collected (19 ml) which contained 10.9 g of water. The system was cooled to 175° C. and a solution of 75.0 g (0.51 gram-mole) of 1,4-dichlorobenzene in 80 g of N-methyl-2-pyrrolidone was charged. The reactor was closed off under a slight $N_2$ pressure and heated to 245° C. in 10 minutes. After being maintained at 245° C. for 180 minutes at a pressure between 70 and 180 psig, the system was cooled to room temperature.

The product was removed and washed 5 times with 1-liter portions of water. The washed poly(p-phenylene sulfide) product was dried in a vacuum oven at 80° C.

Yield was 48.4 g of polymer (89.5 percent yield) having an inherent viscosity of 0.09, a crystalline melting point of 278° C. and an infrared spectrum essentially identical with that of poly(p-phenylene sulfide) prepared by a method of the prior art.

The following example provides a comparison between the method of the invention, as carried out in Example I, and a method outside of the invention in which NaSH, but not sodium N-methyl-4-aminobutyrate, is employed.

EXAMPLE II

To a stirred autoclave were charged 83.6 g (1.0 gram-mole, 67 percent assay) of NaSH and 276.7 g of N-methyl-2-pyrrolidone.

The dehydration by heating (1 hour, 25 minutes) to 198° C. yielded 22 ml of distillate containing 20.0 g of water. A solution of 149.9 g (1.02 gram-moles) of 1,4-dichlorobenzene in 50 g of N-methyl-2-pyrrolidone was introduced into the autoclave. The system was closed off and the polymerization was conducted as in Example I at a pressure of 100–205 psig.

The poly(p-phenylene sulfide) product was recovered, washed and amounted to 43.1 g (40 percent yield) having an inherent viscosity of 0.03 and a crystalline melting point of 258° C.

Thus, the polymer in this example was obtained in lower yield and had a lower molecular weight than that obtained in Example I.

An alkali metal aminoalkanoate having the formula $RNH(CR_2)_nCO_2M$, wherein each R is as defined above, M is an alkali metal selected from sodium, potassium, rubidium and cesium, $n$ is an integer having a value of 2 to about 12, and the total number of carbon atoms in each molecule of the alkali metal aminoalkanoate is within the range of 3 to about 24, can be produced in high yield by the reaction of an alkali metal hydroxide selected from sodium hydroxide, potassium hydroxide, rubidium hydroxide and cesium hydroxide with a lactam having the formula

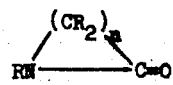

wherein each R is as defined above, $n$ is an integer having a value of 2 to about 12, and the total number of carbon atoms in each molecule of the lactam is within the range of 3 to about 24, using from about 1 to about 3 gram-moles of water per gram-mole of alkali metal hydroxide. For example, using about 2.7 gram-moles of water per gram-mole of sodium hydroxide, sodium N-methyl-4-aminobutyrate was obtained in a yield of 89 percent. In contrast, it has been determined that the yield of sodium N-methyl-4-aminobutyrate is only about 16 percent when similarly prepared, except that water is absent.

Examples of some lactams as described above which can be employed to produce alkali metal aminoalkanoates include 2-azetidinone, 2-pyrrolidone, 2-piperidone, ε-caprolactam, N-methyl-2-pyrrolidone, N-ethyl-2-piperidone, N-isopropyl-ε-caprolactam, N-dodecyl-3-octyl-2-pyrrolidone, N-cyclopentyl-4-dodecyl-2-piperidone, N-phenyl-3-butyl-4-benzyl-2-pyrrolidone, N-m-tolyl-2-azetidinone, N-benzyl-4-o-tolyl-2-piperidone, 3-phenyl-2-pyrrolidone, lactam of N-butyl-4-cyclohexyl-7-methyl-8-aminooctanoic acid, lactam of N-octyl-3-ethyl-5-isopropyl-7-aminoheptanoic acid, lactam of 10-aminodecanoic acid, lactam of 13-aminotridecanoic acid, and the like, and mixtures thereof.

Examples of alkali metal aminoalkanoates which can be produced from the lactams as described above include sodium 3-aminopropionate, sodium 4-aminobutyrate, potassium 5-aminovalerate, rubidium 6-aminohexanoate, sodium N-methyl-4-aminobutyrate, cesium N-ethyl-5-aminovalerate, potassium N-isopropyl-6-aminohexanoate, potassium N-dodecyl-2-octyl-4-aminobutyrate, sodium N-cyclopentyl-3-dodecyl-5-aminovalerate, rubidium N-phenyl-2-butyl-3-benzyl-4-aminobutyrate, sodium N-m-tolyl-3-aminopropionate, potassium N-benzyl-3-o-tolyl-5- aminovalerate, cesium 2-phenyl-4-aminobutyrate, sodium N-butyl-4-cyclohexyl-7-methyl-8-aminooctanoate, sodium N-octyl-3-ethyl-5-isopropyl-7-aminoheptanoate, potassium 10-aminodecanoate, rubidium 13-aminotridecanoate, and the like, and mixtures thereof.

In the preparation of the alkali metal aminoalkanoate from the lactam and the alkali metal hydroxide, using from about 1 to about 3 gram-moles of water per gram-mole of alkali metal hydroxide, the lactam generally will be employed in an amount within the range of from about 2 to about 8 gram-moles per gram-mole of alkali metal hydroxide. The reaction temperature should be sufficient to permit distillation of water from the mixture at substantially atmospheric pressure without substantial distillation of lactam. Although the reaction temperature will depend in part on the lactam employed, it generally will be within the range of from about 120° C. to about 210° C. The reaction time will depend in part on the reaction temperature but generally will be within the range of from about 5 minutes to about 6 hours. The reaction and distillation of water are most conveniently conducted at substantially atmospheric pressure.

Even though alkali metal hydroxides such as sodium hydroxide are not soluble to a large extent in lactams such as N-methyl-2-pyrrolidone, this method allows the production of a homogeneous solution of an alkali metal aminoalkanoate such as sodium N-methyl-4-aminobutyrate in a lactam such as a N-methyl-2-pyrrolidone. This is a particularly useful solution which can be used for many chemical conversions such as, for example, in the preparation of arylene sulfide polymers such as poly(p-phenylene sulfide) from alkali metal bisulfides such as sodium bisulfide and polyhalo-substituted aromatic compounds such as 1,4-dichlorobenzene.

Preparation of sodium N-methyl-4-aminobutyrate by the above procedures is illustrated by the following examples.

EXAMPLE III

Into a 1-liter reactor were charged 41.24 g of NaOH (1.0 gram-mole, 97 percent assay), 300 ml (3.1 gram-moles) of N-methyl-2-pyrrolidone, and 48.6 g (2.7 gram-moles) water. The mixture was heated and agitated under a slow flow of nitrogen. After 30 minutes, the temperature reached 118° C. and water began to distill from the system.

The temperature was increased to 186° C. in 65 minutes yielding a light amber-colored liquid. The distillate (52 ml) contained 40 g of water.

After cooling the contents of the reactor to room temperature, 500 ml of benzene was added. The product was slurried in this mixture, collected by filtration and washed twice with 1,200-ml portions of benzene and once with 1,200 ml of hexane.

After drying in a vacuum desiccator over $P_2O_5$, 131 g of sodium N-methyl-4-aminobutyrate was obtained. This material had a m.p. of 204°–210° C., and an elemental analysis, calculated, of C—43.2 percent, H—7.2 percent, N—10.1 percent, Na—16.5 percent and an analysis, found, of C—42.6 percent, H—7.1 percent, N—10.2 percent and Na—16.8 percent.

In a similar reaction employing the same quantity of reactants heated to 185° C. in 120 minutes to obtain 60 ml of a distillate containing 50.3 g of water, the yield of sodium N-methyl-4-aminobutyrate isolated was 123.3 g, an 89 percent yield.

EXAMPLE IV

Into a 1-liter reactor were placed 41.24 g of NaOH (1.0 gram-mole, 97 percent assay) and 300 ml (3.1 gram-moles) of N-methyl-2-pyrrolidone. No water was introduced into the reactor.

The mixture was heated to 186° C. in 90 minutes under a slow flow of nitrogen. A considerable amount of the NaOH remained undissolved.

The solution was cooled to 155° C. and decanted from the unreacted sodium hydroxide. After cooling to room temperature, the product was washed 3 times in 500-ml. portions of benzene and twice in 500-ml portions of hexane.

After drying in a vacuum desiccator over $P_2O_5$, 21.8 g (16 percent yield) of sodium N-methyl-4-aminobutyrate was obtained.

It will be evident from the foregoing that various modifications can be made to the method of this invention. Such are considered, however, to be within the scope thereof.

What is claimed is:

1. A method of producing a polymer which comprises:
   a. forming a composition by contacting at least one polyhalo-substituted aromatic compound wherein the halogen atoms are attached to aromatic ring carbon atoms, at least one organic amide, at least one alkali metal aminoalkanoate having the formula $R_2N(CR_2)_nCO_2M$ wherein each R is selected from the group consisting of hydrogen and hydrocarbyl radicals selected from alkyl, cycloalkyl, and aryl and combinations of said radicals, the number of carbon atoms in each of said hydrocarbyl radicals being within the range of 1 to about 12, M is an alkali metal selected from the group consisting of lithium, sodium, potassium, rubidium and cesium, $n$ is an integer of 1 to about 12, and the total number of carbon atoms in each molecule of said alkali metal aminoalkanoate is within the range of 2 to about 24, and an alkali metal bisulfide selected from the group consisting of lithium bisulfide, sodium bisulfide, potassium bisulfide, rubidium bisulfide and cesium bisulfide; and,
   b. maintaining at least a portion of said composition at polymerization conditions to produce said polymer.

2. The method of claim 1 in which said polyhalo-substituted aromatic compound is employed in an amount within the range of from about 0.9 to about 2 gram-moles per gram-mole of alkali metal bisulfide.

3. The method of claim 2 in which the alkali metal aminoalkanoate is employed in an amount within the range of from about 0.3 to about 4 gram-moles per gram-mole of alkali metal bisulfide.

4. The method of claim 2 in which said organic amide is employed in an amount within the range of from about 100 grams to about 2,500 grams per gram-mole of said polyhalo-substituted aromatic compound.

5. The method of claim 1 in which said alkali metal aminoalkanoate is sodium N-methyl-4-aminobutyrate.

6. The method of claim 5 in which said alkali metal bisulfide is sodium bisulfide.

7. The method of claim 6 in which said alkali metal aminoalkanoate is employed in an amount of about 1 gram-mole per gram-mole of alkali metal bisulfide.

8. The method of claim 1 in which water is removed from said composition prior to maintaining said composition at polymerization conditions.

9. The method of claim 7 in which water is removed from said composition prior to maintaining said composition at polymerization conditions.

10. A method of producing a polymer which comprises:
   a. contacting at least one organic amide, at least one alkali metal bisulfide selected from the group consisting of lithium bisulfide, sodium bisulfide, potassium bisulfide, rubidium bisulfide and cesium bisulfide and at least one alkali metal aminoalkanoate having the formula $R_2N(CR_2)_nCO_2M$ wherein each R is selected from the group consisting of hydrogen and hydrocarbyl radicals selected from alkyl, cycloalkyl and aryl and combinations of said radicals, the number of carbon atoms in each of said hydrocarbyl radicals being within the range of 1 to about 12, M is an alkali metal selected from the group consisting of lithium, sodium, potassium, rubidium and cesium, $n$ is an integer of 1 to about 12, and the total number of carbon atoms in each molecule of said alkali metal aminoalkanoate is within the range of 2 to about 24, to form a first composition;
   b. contacting at least a portion of said first composition with at least one polyhalo-substituted aromatic compound wherein the halogen atoms are attached to aromatic ring carbon atoms to form a second composition; and,
   c. maintaining said second composition at polymerization conditions to form said polymer.

11. The method of claim 10 in which said polyhalo-substituted aromatic compound is employed in an amount within the range of from about 0.9 to about 2 gram-moles per gram-mole of alkali metal bisulfide.

12. The method of claim 11 in which the alkali metal aminoalkanoate is employed in an amount within the range of from about 0.3 to about 4 gram-moles per gram-mole of alkali metal bisulfide.

13. The method of claim 11 in which said organic amide is employed in an amount within the range of from about 100 grams to about 2,500 grams per gram-mole of said polyhalo-substituted aromatic compound.

14. The method of claim 10 in which said alkali metal aminoalkanoate is sodium N-methyl-4-aminobutyrate.

15. The method of claim 14 in which said alkali metal bisulfide is sodium bisulfide.

16. The method of claim 15 in which said alkali metal aminoalkanoate is employed in an amount of about 1 gram-mole per gram-mole of alkali metal bisulfide.

17. The method of claim 10 in which water is removed from said first composition prior to maintaining said second composition at polymerization conditions.

18. The method of claim 16 in which water is removed from said first composition prior to maintaining said second composition at polymerization conditions.

19. The method of claim 10 in which said polyhalo-substituted aromatic compound is 1,4-dichlorobenzene.

* * * * *